Figure 1:
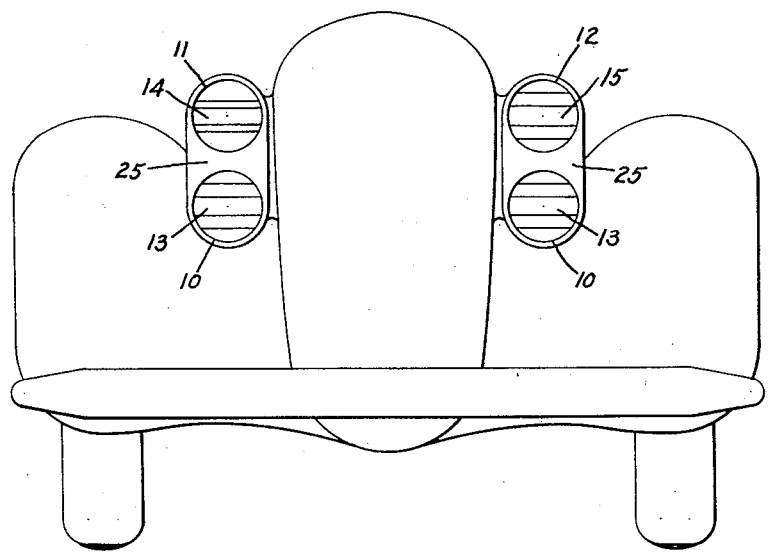

Aug. 22, 1939. T. W. FRECH ET AL 2,170,682

VEHICLE HEADLIGHTING SYSTEM

Filed Aug. 21, 1937 12 Sheets-Sheet 1

Inventors:
Theodore W. Frech,
Ernest A. Howard,
Kenneth D. Scott,
by Harry E. Dunham
Their Attorney.

Aug. 22, 1939.　　T. W. FRECH ET AL　　2,170,682
VEHICLE HEADLIGHTING SYSTEM
Filed Aug. 21, 1937　　12 Sheets-Sheet 2
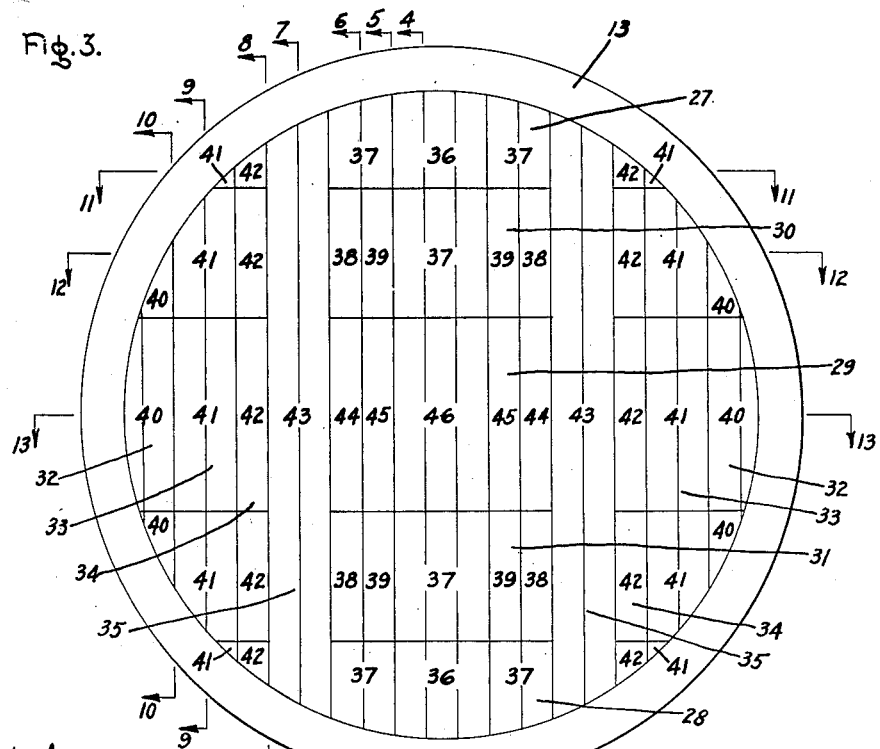
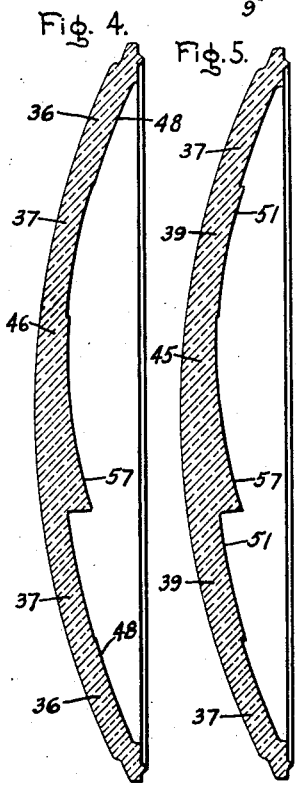
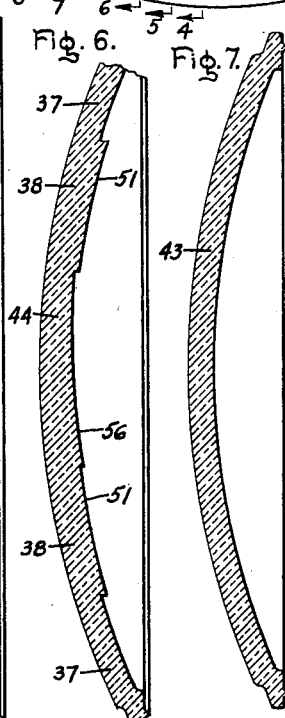
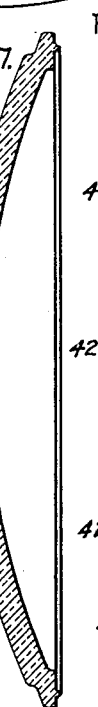
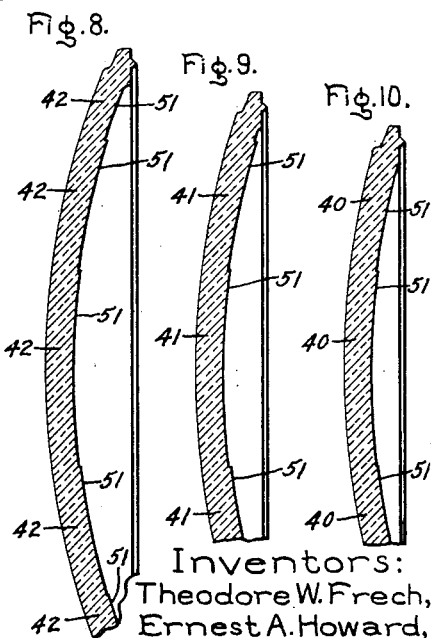
Inventors:
Theodore W. Frech,
Ernest A. Howard,
Kenneth D. Scott,
by Harry E. Dunham
Their Attorney.

Aug. 22, 1939.  T. W. FRECH ET AL  2,170,682
VEHICLE HEADLIGHTING SYSTEM
Filed Aug. 21, 1937   12 Sheets-Sheet 3

Inventors:
Theodore W. Frech,
Ernest A. Howard,
Kenneth D. Scott,
by Harry E. Dunham
Their Attorney.

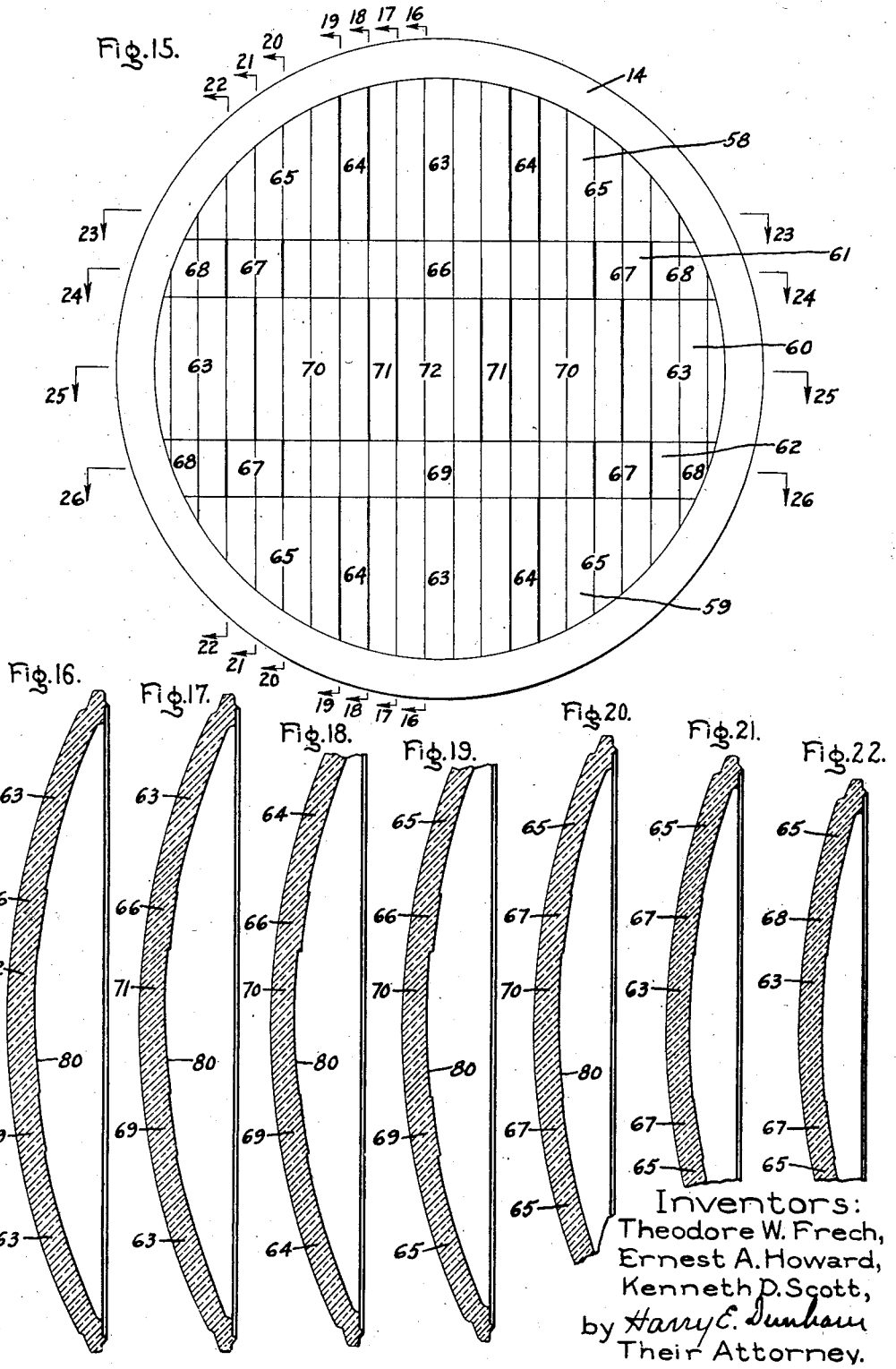

Aug. 22, 1939.  T. W. FRECH ET AL  2,170,682
VEHICLE HEADLIGHTING SYSTEM
Filed Aug. 21, 1937  12 Sheets-Sheet 5
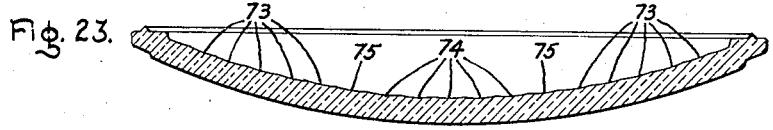
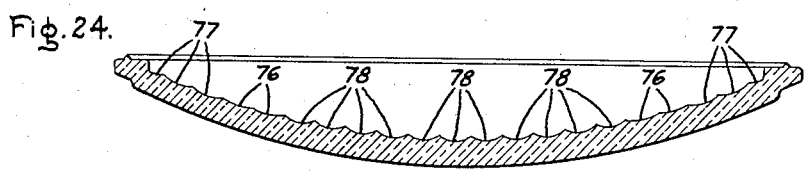
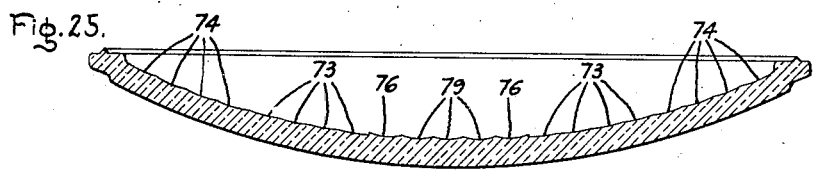
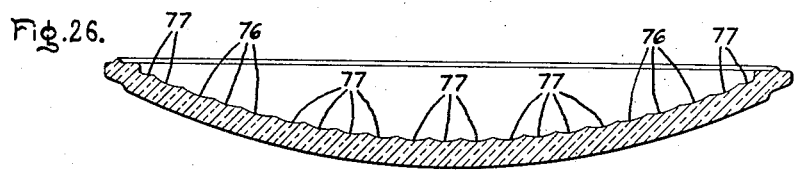
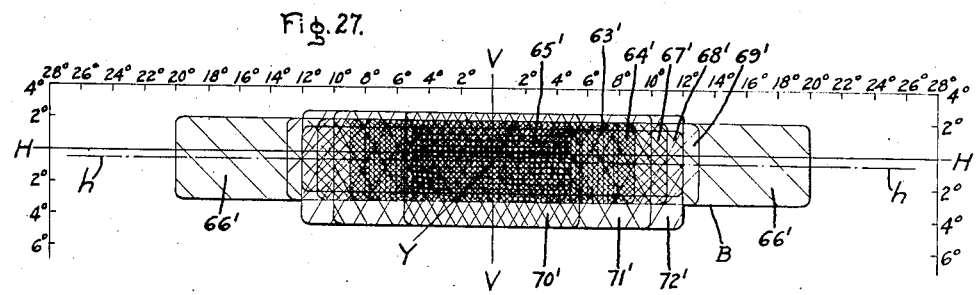
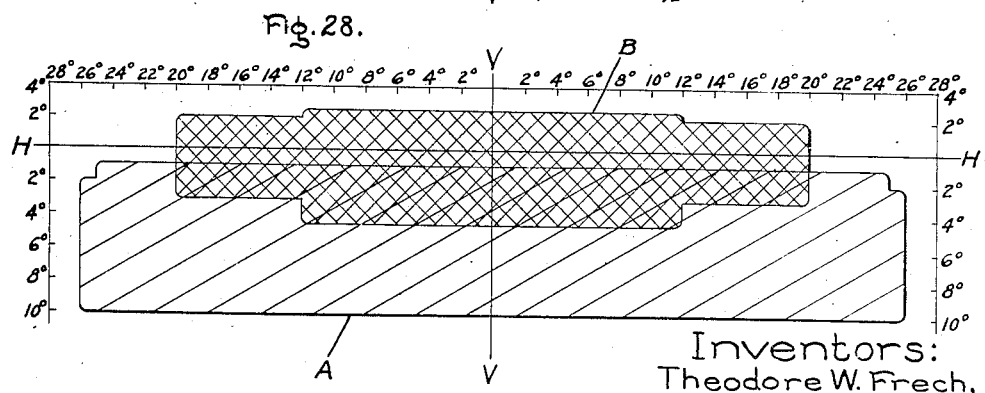
Inventors:
Theodore W. Frech,
Ernest A. Howard,
Kenneth D. Scott,
by Harry E. Dunham
Their Attorney.

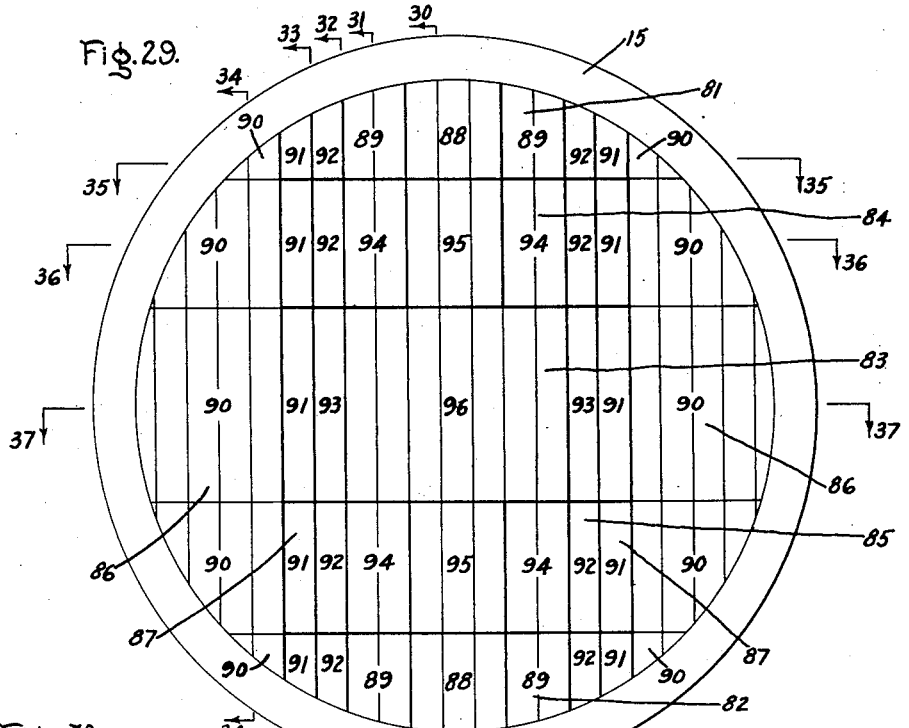
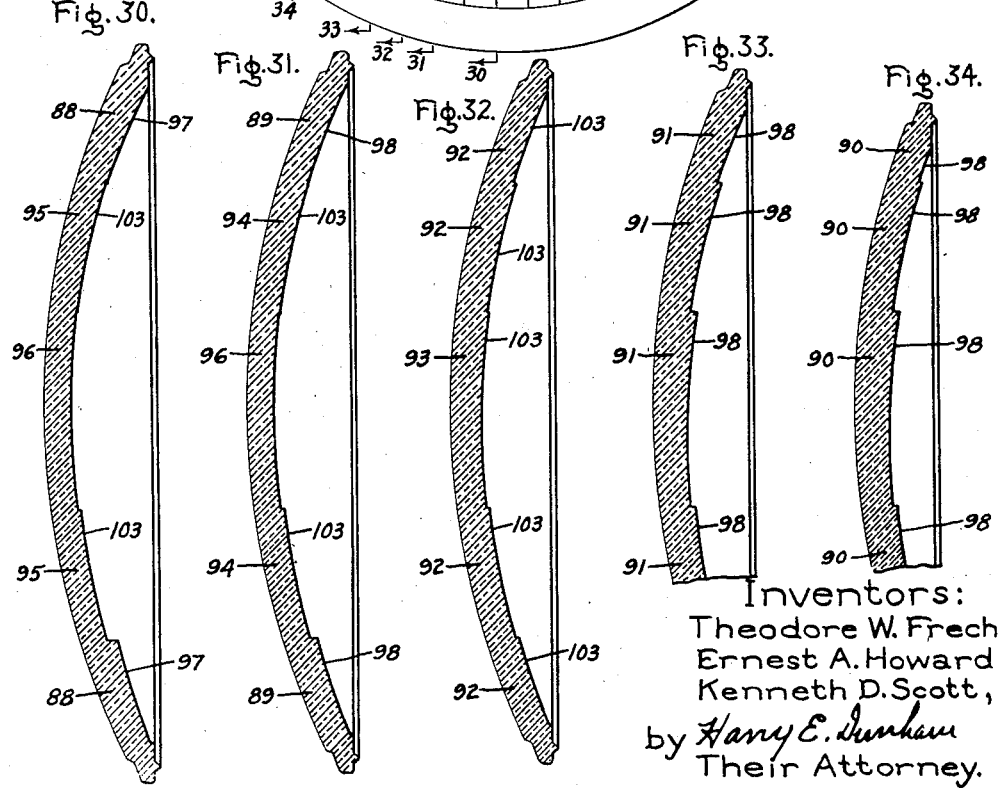

Inventors:
Theodore W. Frech,
Ernest A. Howard,
Kenneth D. Scott,
by Harry E Dunham
Their Attorney.

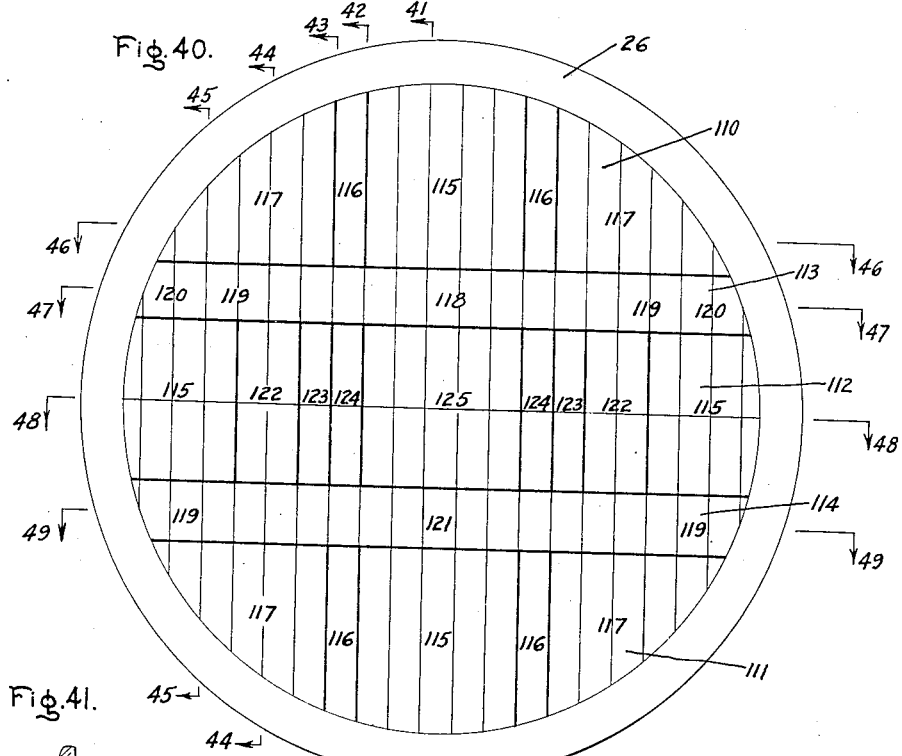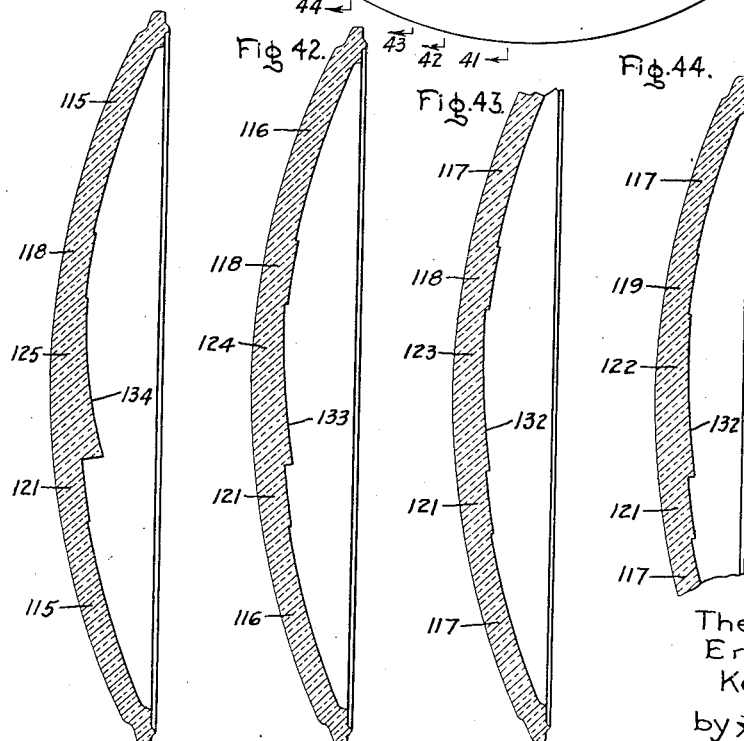

Inventors:
Theodore W. Frech,
Ernest A. Howard,
Kenneth D. Scott,
by Harry E. Dunham
Their Attorney.

Aug. 22, 1939.  T. W. FRECH ET AL  2,170,682
VEHICLE HEADLIGHTING SYSTEM
Filed Aug. 21, 1937   12 Sheets-Sheet 10
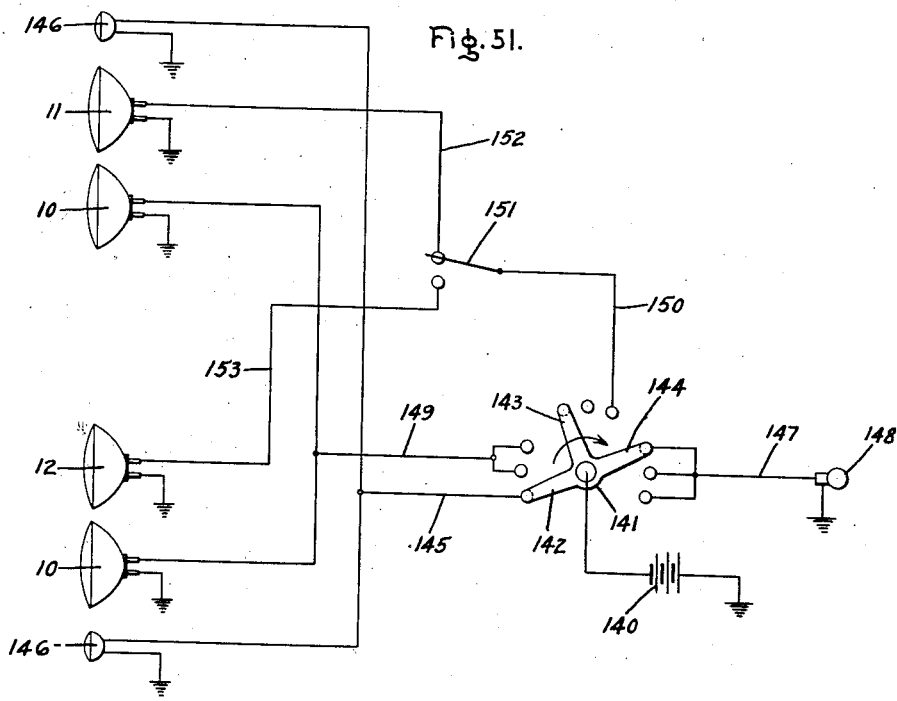
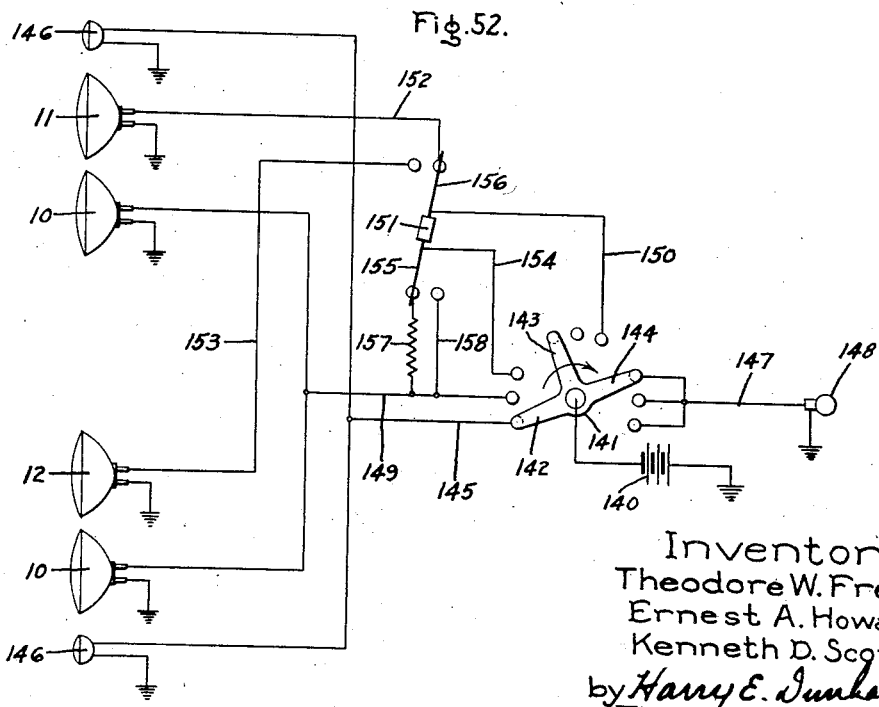
Inventors:
Theodore W. Frech,
Ernest A. Howard,
Kenneth D. Scott,
by Harry E. Dunham
Their Attorney.

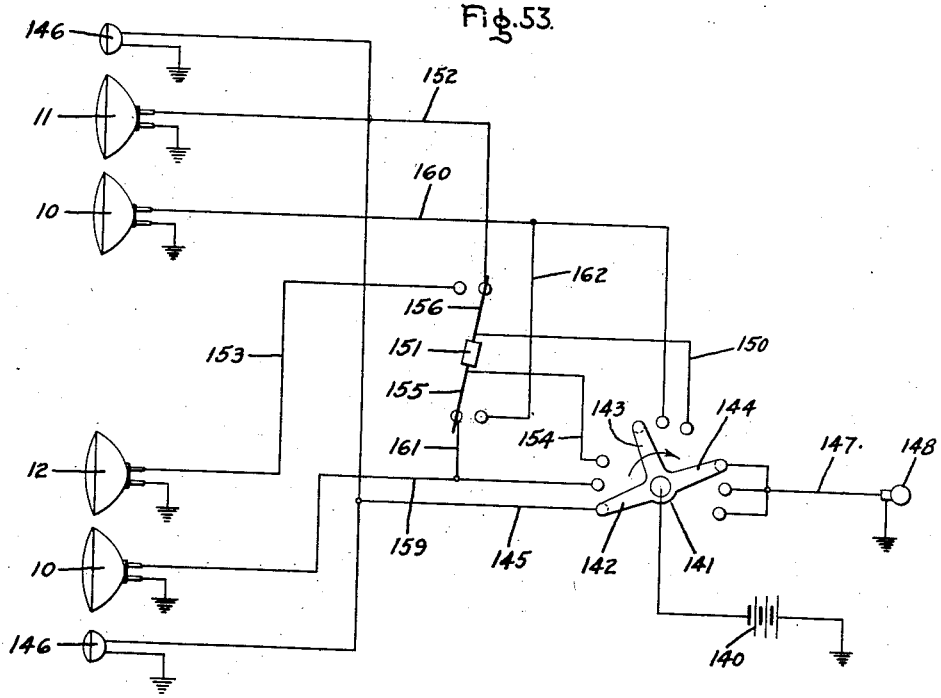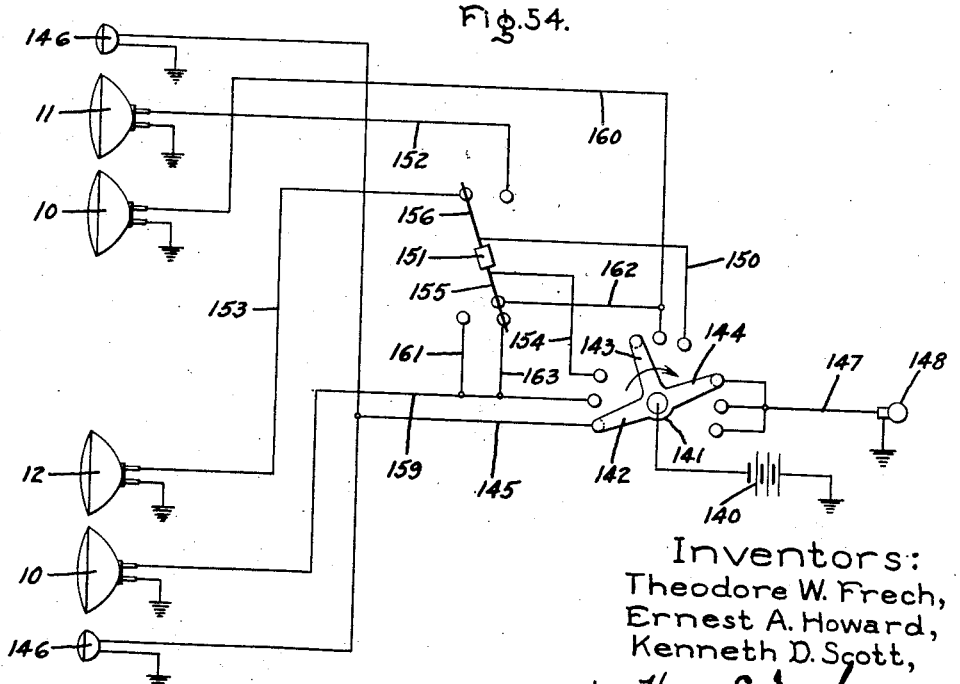

Aug. 22, 1939.　　T. W. FRECH ET AL　　2,170,682
VEHICLE HEADLIGHTING SYSTEM
Filed Aug. 21, 1937　　12 Sheets-Sheet 12

Inventors:
Theodore W. Frech,
Ernest A. Howard,
Kenneth D. Scott,
by Harry E. Dunham
Their Attorney.

Patented Aug. 22, 1939

2,170,682

UNITED STATES PATENT OFFICE 2,170,682

VEHICLE HEADLIGHTING SYSTEM

Theodore W. Frech and Ernest A. Howard, Cleveland Heights, and Kenneth D. Scott, Cleveland, Ohio, assignors to General Electric Company, a corporation of New York Application August 21, 1937, Serial No. 160,278

5 Claims. (Cl. 240—41.3)

Our invention relates to vehicle headlighting systems and to the design of lenses for use in connection therewith. More particularly, our invention relates primarily to a vehicle headlighting system in which a base beam is employed to provide the necessary illumination for city driving purposes, to which base beam are added, as occasion may require, various other beam components to thereby provide country driving, country meeting, or other types of composite beams.

Our novel vehicle headlighting system has been developed in conjunction with projection devices of the reflector lamp type such as is described and claimed in co-pending applications Serial No. 68,713, filed March 13, 1936, and Serial No. 143,504, filed May 19, 1937, by Daniel K. Wright, and assigned to the same assignee as the present invention. Lamps of this type are particularly suitable for use in our headlighting system by reason of the extreme accuracy with which they can be made, which results in the projection of a powerful, efficient and accurately directed beam of light.

One object of our invention is the provision of a vehicle headlighting system capable of projecting, as occasion may require, a city driving, country driving, or a country meeting beam, said beams being accurately directed and so shaped in vertical cross section as to best accomplish the particular type of illumination for which they were designed.

Another object of our invention is the provision of a vehicle headlighting system in which a city driving or base beam is produced by one or more headlamps, and to which base beam are added, as occasion demands, supplementary beam components provided by additional headlamps, the composite beams thus produced constituting either a country driving or a country meeting beam, depending upon the particular type of beam component added to the base beam.

Still another object of our invention is the provision of a vehicle headlighting system in which city driving, country driving, and country meeting beams may be produced with a minimum number of single filament headlamp units and with a minimum amount of beam compromise.

A further object of our invention is the provision of a vehicle headlighting system in which a city driving or base beam is produced by one or more headlamps, a country driving beam by one or more additional headlamps, and a country meeting beam by the addition of a beam component, produced by still another headlamp or headlamps, to the said base beam.

A still further object of our invention is the provision of suitable projection devices or lamps for use in our novel vehicle headlighting system, which lamps will effect the proper distribution and projection of the light rays emanating therefrom to produce the various types of beams mentioned hereinbefore.

Another object of our invention is the design of suitable cover glasses or lenses for the lamps employed in our vehicle headlighting system, said lenses being formed with various flutes and prisms so shaped and located thereon as to distribute and direct the rays of light projected by the associated lamp in the proper manner to produce one or the other of the aforementioned beams or beam components.

Figure 2:
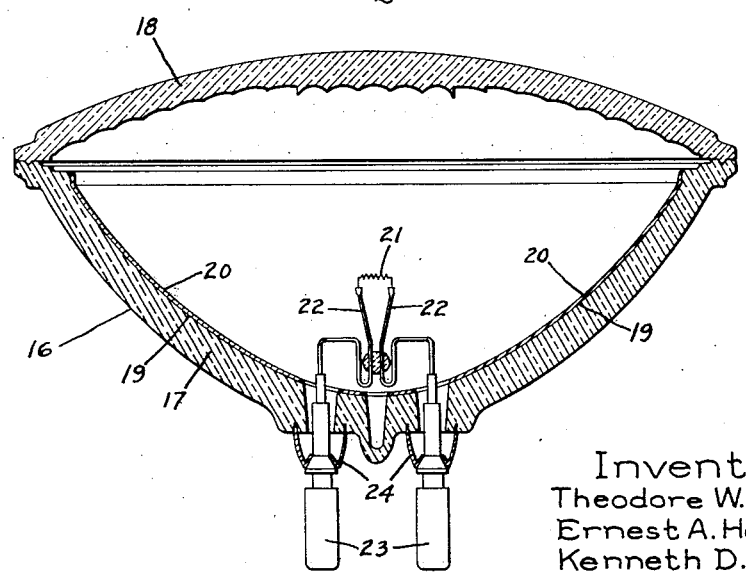
Figure 11:
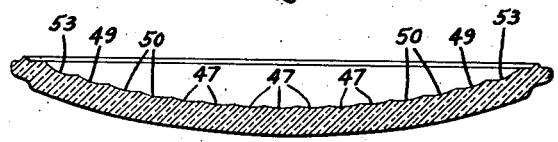
Figure 12:
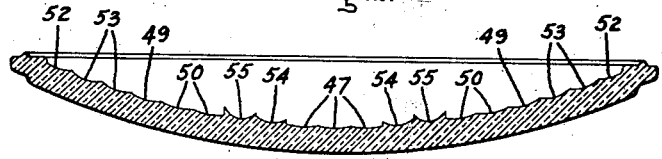
Figure 13:
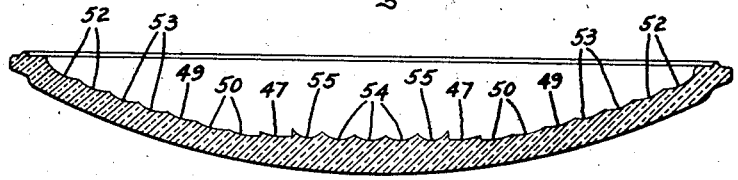
Figure 14:
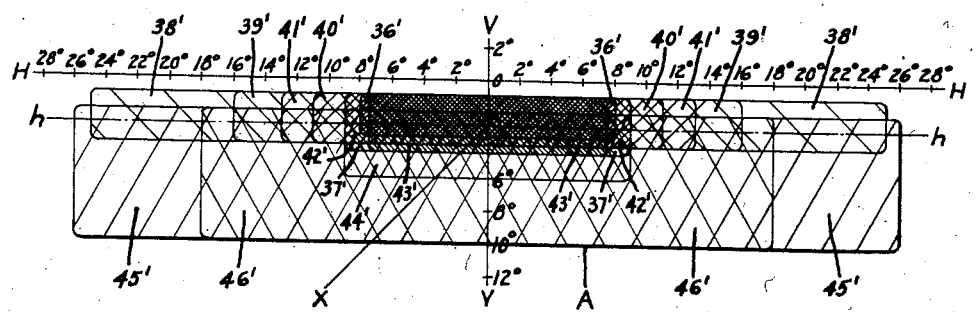
Figure 35:
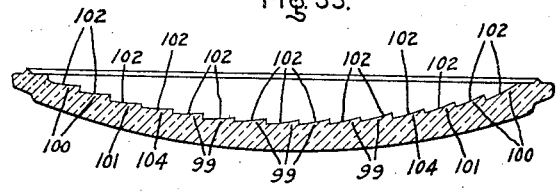
Figure 36:
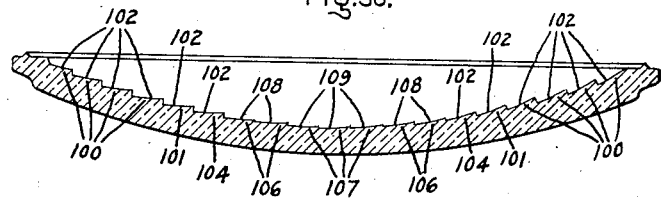
Figure 37:
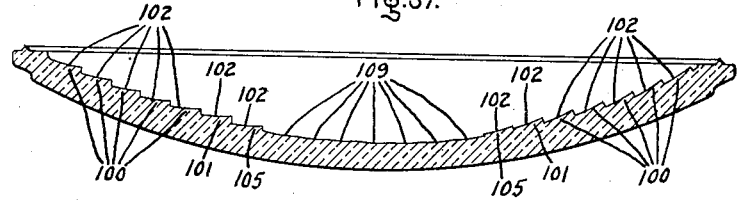
Figure 38:
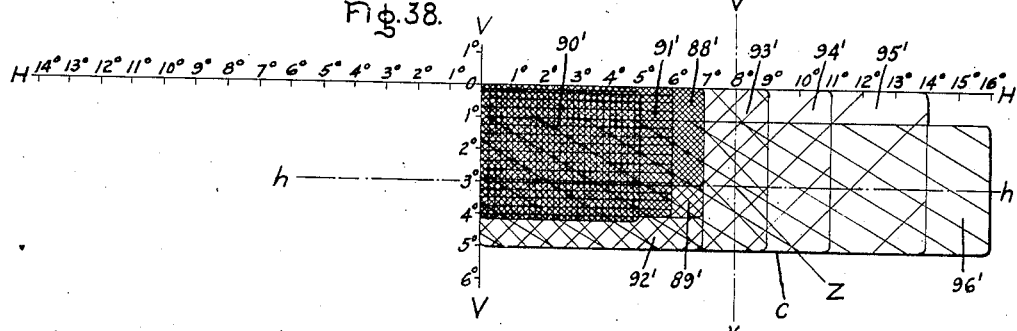
Figure 39:
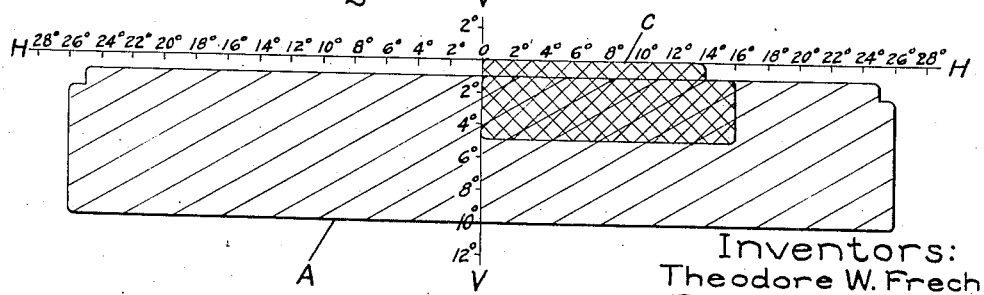
Figure 46:
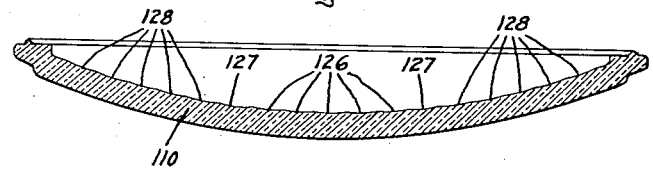
Figure 50:
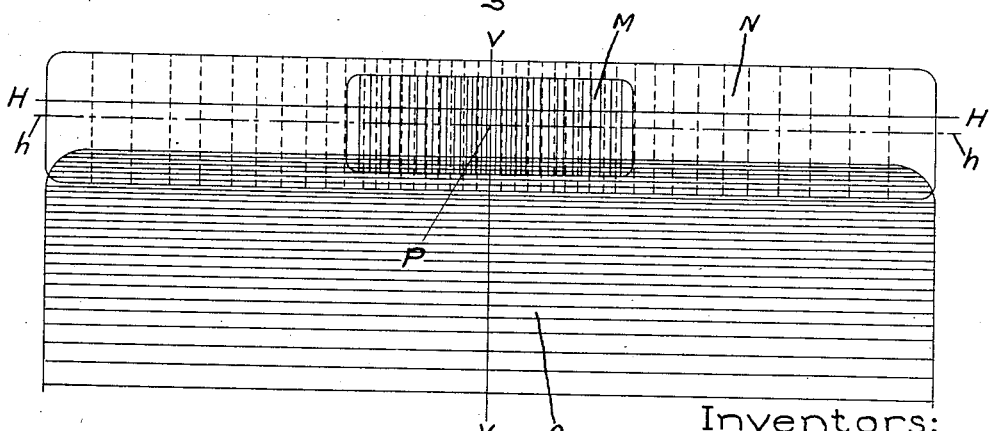
Figure 55:
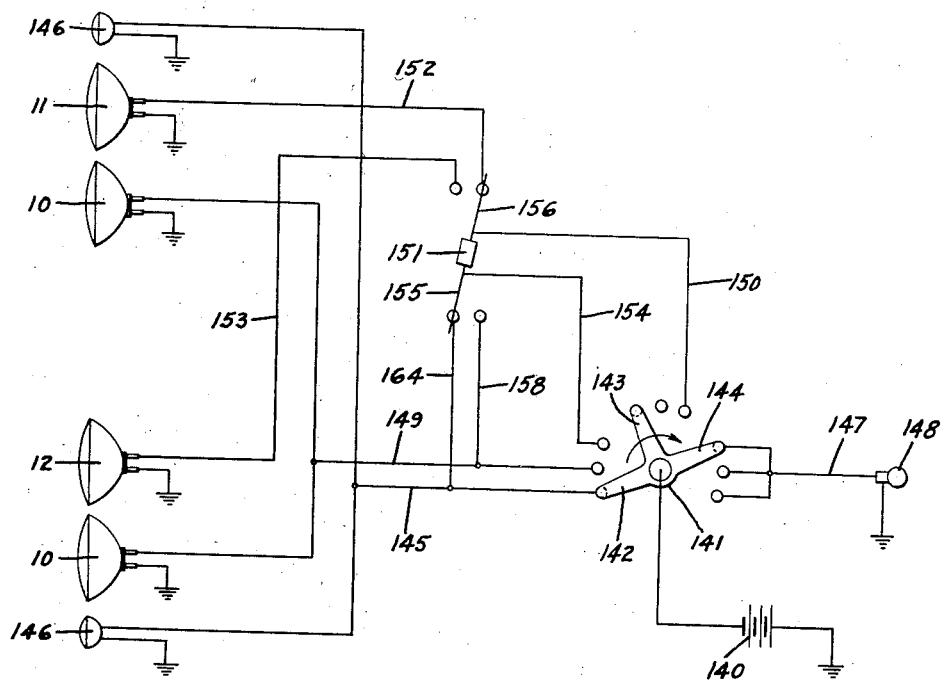

Further objects and advantages of our invention will appear from the following detailed description of species thereof and from the accompanying drawings in which:

Fig. 1 is a diagrammatic front elevation of a portion of a motor vehicle showing a suitable arrangement of lamps thereon to provide the headlighting system comprising our invention; Fig. 2 is a horizontal sectional view of one of the reflector lamps employed in our vehicle headlighting system; Fig. 3 is a front elevation of a city driving lens comprising our invention, said lens being adapted to produce the base beam of our headlighting system; Figs. 4 to 10 inclusive are vertical sectional views taken on the lines 4—4, 5—5, 6—6, 7—7, 8—8, 9—9 and 10—10 of Fig. 3; Figs. 11 to 13 inclusive are horizontal sectional views taken on the lines 11—11, 12—12 and 13—13 of Fig. 3; Fig. 14 is a view showing the beam pattern produced by one of the city driving lenses illustrated in Figs. 3 to 13 when mounted on a reflector lamp of the type shown in Fig. 2; Fig. 15 is a front elevation of a country driving lens comprising our invention, said lens being adapted to produce the country driving beam component of our headlighting system; Figs. 16 to 22 inclusive are vertical sectional views taken on the lines 16—16, 17—17, 18—18, 19—19, 20—20, 21—21 and 22—22 of Fig. 15; Figs. 23 to 26 inclusive are horizontal sectional views taken on the lines 23—23, 24—24, 25—25 and 26—26 of Fig. 15; Fig. 27 is a view showing the beam pattern of the country driving beam component produced by one of the country driving lenses illustrated in Figs. 15 to 26 when mounted on a reflector lamp of the type shown in Fig. 2;

Fig. 28 is a view of the composite country driving beam pattern produced by the addition of the driving beam component illustrated in Fig. 27 to the base beam of Fig. 14; Fig. 29 is a front elevation of a country meeting lens comprising our invention, said lens being adapted to produce the country meeting beam component of our headlighting system; Figs. 30 to 34 inclusive are vertical sectional views taken on the lines 30—30, 31—31, 32—32, 33—33 and 34—34 of Fig. 29; Figs. 35 to 37 inclusive are horizontal sectional views taken on the lines 35—35, 36—36 and 37—37 of Fig. 29; Fig. 38 is a view showing the beam pattern of the country meeting beam component produced by one of the country meeting lenses illustrated in Figs. 29 to 37 when mounted on a reflector lamp of the type shown in Fig. 2; Fig. 39 is a view of the composite country meeting beam pattern produced by the addition of the meeting beam component illustrated in Fig. 38 to the base beam of Fig. 14; Fig. 40 is a front elevation of a modified form of country driving lens adapted to produce a full country driving beam by itself, without the use of a base beam as in the previous form of the invention; Figs. 41 to 45 inclusive are vertical sectional views taken on the lines 41—41, 42—42, 43—43, 44—44 and 45—45 of Fig. 40; Figs. 46 to 49 inclusive are horizontal sectional views taken on the lines 46—46, 47—47, 48—48 and 49—49 of Fig. 40; Fig. 50 is a view showing the beam pattern produced by the modified form of country driving lens illustrated in Figs. 40 to 49, when mounted on a reflector lamp of the type shown in Fig. 2; Figs. 51 to 54 illustrate diagrammatically various forms of lighting circuits which may be employed to produce our vehicle headlighting system; and Fig. 55 is a diagrammatic illustration of a lighting circuit which may be employed in the modification of our invention in which the country driving lamp is adapted to produce a full country driving beam by itself.

Referring to the drawings, there is illustrated in Fig. 1 a diagrammatic view of the front portion of a motor vehicle provided with our novel headlighting system. As there shown, our headlighting system comprises a pair of laterally spaced city driving lamps 10, 10, a country driving lamp 11, and a country meeting lamp 12. Lamps 10, 10 are provided with city driving lenses 13, 13 adapted to produce a city driving or base beam, the pattern of which is shown in Fig. 14; lamp 11 is provided with a country driving lens 14 adapted to produce a country driving beam component, the pattern of which is shown in Fig. 27; and lamp 12 is provided with a country meeting lens 15 adapted to produce a country meeting beam component, the pattern of which is shown in Fig. 38. Each of the lamps 10, 11 and 12 is preferably of the type described and claimed in the previously mentioned co-pending applications Serial Nos. 68,713 and 143,504, and comprises a bulb or envelope 16 (Fig. 2) consisting of a preformed pressed glass reflector section 17 sealed around its periphery to a preformed pressed glass cover or lens section 18. The said reflector and cover glass sections 17 and 18, respectively, are preferably made of low-expansion glass, such as that commercially known as "Pyrex" and described and claimed in United States Patent No. 1,304,623, Sullivan et al., issued May 27, 1919. The interior surface 19 of the reflector section 17 is of paraboloidal or any other desirable shape, and is covered with a metallic coating 20, preferably of aluminum and constituting a reflecting surface. By pressing the reflector section 17 rather than blowing the same, the interior paraboloidal surface 19 can be made with extreme accuracy, much more so than is possible with the conventional stamped metal reflectors or with blown glass reflectors. A concentrated light source, comprising a horizontally disposed filament 21, is mounted within the bulb or envelope 16 by lead wires 22, terminal members 23, and metal cups 24, and is accurately positioned at the focal point of the reflecting surface 19 and in the same plane as that of the terminal members 23. The accurate disposition of the concentrated light source at the said focal point, together with the great accuracy with which the pressed glass paraboloidal interior surface 19 can be formed, results in the projection of a powerful, efficient and accurately-directed beam of light.

As indicated in Fig. 1, the country driving lamp 11 is preferably mounted on the right side of the vehicle and the country meeting lamp 12 on the left side of the same. The disposition of the country meeting lamp on the left side is preferable for the reason that when meeting another vehicle it is desirable that the location of the left side of the vehicle be distinctly marked to the approaching driver so that he may have a definite idea of how much room to allow for the safe meeting of such other vehicle. Should the left city driving lamp 10 become inoperative for any reason, the country meeting lamp 12, by being mounted on the left side of the vehicle, would therefore insure the marking or locating of such side to the approaching driver. The lamps at each side of the vehicle may be mounted in a holder or housing 25 attached to the front portion of the motor vehicle, or if desired, they may be mounted in suitable recesses provided in the vehicle fenders or fender aprons, thus carrying out modern streamlining trends.

As previously stated, the lamps 10, 10, in conjunction with the associated lenses 13, 13, are adapted to project a city driving beam, hereinafter termed the base beam A, the pattern of which is shown in Fig. 14. This base beam provides sufficient illumination in advance of, and at the sides of the vehicle to meet all requirements of city driving. As is evident from the beam pattern (Fig. 14), the base beam is characterized by a widespread high intensity portion located at and closely adjacent the top of the beam and symmetrically disposed about the vertical center line of the same. The base beam is further characterized by the absence of light rays above the horizontal, so that the danger of glare impairing the vision of pedestrians and approaching drivers is reduced to a minimum.

For open country driving, where illumination a maximum distance in advance of the vehicle is desirable, the light from the lamp 11, hereinafter termed the supplementary country driving beam component, is added to the base beam projected by the lamps 10, 10. This supplementary driving beam component B (Fig. 27), when thus added to the base beam A, produces a composite country driving beam, the pattern outline of which is shown in Fig. 28, wherein a high intensity layer of light is added to the top or upper portion of the base beam, and also substantially above such portion, thus providing illumination a maximum distance in advance of the vehicle.

Because of the addition of the layer of light to the top of the base beam, the composite country driving beam just described is consequently characterized by the presence of a considerable amount of glare, which of course is extremely objectionable when meeting another vehicle because of the danger of impairment of the approaching driver's vision. For this reason, we have provided a composite country meeting beam formed by the addition of light from the lamp 12, hereinafter termed the supplementary country meeting beam component, to the previously described base beam, it being understood that the driving lamp 11 is rendered inoperative when the meeting lamp 12 is operated. The supplementary meeting beam component C (Fig. 38), when thus added to the base beam A, produces a composite country meeting beam, the pattern outline of which is shown in Fig. 39, wherein a high intensity layer of light, characterized by a sharp cut-off to the left of the vertical and above the horizontal, is added to the upper right portion of the base beam and partly above such portion, thus providing illumination a considerable distance in advance of the vehicle down the right side only of the highway so as not to interfere with the approaching driver's vision.

To further minimize beam compromises, it may be desirable to produce the country driving beam solely by the lamp 11, without the use of the base beam employed in the previous form of the invention. In this modification, the lamp 11 is equipped with a lens 26 (Figs. 40 to 49) adapted to produce a full country driving beam, the pattern of which is shown in Fig. 50, it being understood that the city and country meeting beams are produced in the same manner as before. With this system, it is desirable that the parking lights be automatically switched on whenever the single country driving lamp 11 is operated, to thereby mark the sides of the vehicle and further to provide light and markers in case of failure of said driving lamp.

In Figs. 3 to 13, we have illustrated in detail the city driving lens 13 with which the lamps 10, 10 are equipped, and which produces the city driving or base beam A (Fig. 14) of our novel vehicle headlighting system. This lens comprises a plurality of substantially horizontal sections (Fig. 3) disposed adjacent the vertical center line of the lens and consisting of a top section 27, a bottom section 28, a center section 29, and upper and lower intermediate sections 30 and 31 respectively. Each of the top and bottom sections 27 and 28 comprises a central area 36 and side areas 37. Each of the intermediate sections 30, 31 comprises a central area 37, side areas 38 and intermediate areas 39. The center section 29 comprises side areas 44, a center area 46 and intermediate areas 45. The lens further comprises a plurality of vertically extending sections disposed at the sides of the same and consisting of outer side sections 32, 32, primary intermediate side sections 33, 33, secondary intermediate side sections 34, 34, and inner side sections 35, 35. Each of the outer side sections 32, 32 is composed of a plurality of areas 40; the primary intermediate sections 33, 33 of a plurality of areas 41; the secondary intermediate sections 34, 34 of a plurality of areas 42; and the inner side sections 35, 35 of the area 43.

Referring to Figs. 3 and 11, each of the central areas 36 of the top and bottom sections 27, 28 is composed of a plurality of vertically extending horizontal light spreading flutes 47 having a spread of preferably ten degrees. In addition, each of the said areas 36 is provided with an upwardly bending vertical prism 48 (Fig. 4), preferably of one degree. The areas 37, comprising the side portions of the top and bottom sections 27 and 28 respectively and the central portions of the upper and lower intermediate sections 30 and 31 respectively, are likewise composed of a plurality of similarly disposed flutes 47 of preferably ten degree spread, but these areas do not have the vertical prisms peculiar to the areas 36. Since the filament images projected through the areas 36 and 37 are the smallest of the various images projected through the lens, the rays of light passing through such areas, in conjunction with the rays passing through areas 42 and 43, are utilized to produce the high intensity portion of the city driving or base beam. Each of the secondary intermediate side areas 42 is composed of a single vertically-extending flute 49 having a spread of preferably fifteen degrees, while each of the inner side areas 43 is composed of a pair of similarly disposed flutes 50 having a spread of preferably twelve degrees. Each area 42 also has an upwardly bending vertical prism 51 (Fig. 8) of preferably one-half degree.

The high intensity beam portion produced by the areas 36, 37, 42 and 43, and indicated at 36', 37', 42' and 43' in the beam pattern (Fig. 14), is disposed symmetrically about the vertical plane V—V passing through the reflector focal point parallel to the longitudinal axis of the associated vehicle. Beam portions 37' and 43' are also disposed symmetrically about a horizontal line h—h intersecting the reflector axis or aiming point X, but the beam portions 36' and 42', due to the upwardly bending prisms 48 and 51 formed on the lens within the areas 36 and 42, are displaced slightly, though not entirely, above the said h—h line, so that the top surfaces of such beam portions substantially coincide with each other and also with the top surfaces of the beam portions 37' and 43'. This common top surface is located approximately one and three-quarter degrees above the said h—h line. By aiming the reflector axis downward the proper amount below the horizontal plane H—H passing through the reflector focal point, as indicated at X in Fig. 14, the high intensity beam portions 36', 37', 42' and 43' are so directed as to lie entirely below the H—H plane, thereby preventing such beam portions from striking the eyes of pedestrians or approaching drivers. Thus when the aiming point X is located two and three-quarter degrees below the H—H plane, the top surfaces of the beam portions 36', 37', 42' and 43' will lie approximately one degree below such plane, which we have found to be sufficient to insure against the projection of rays of light above the H—H plane under practically all ordinary conditions of loading, or of inaccurately disposed filaments, or of longitudinal rocking motion of the vehicle.

The widespread graduated intensity portion of the city driving beam, indicated at 38', 39', 40' and 41' in Fig. 14 should be directed so that the top surface thereof is likewise maintained approximately one degree below the H—H plane to insure against the occurrence of glare. Areas 38, 39, 40 and 41 are utilized for the production of the widespread graduated intensity portion of the beam for the reason that the filament images projected through such areas are the smallest in size and the easiest to control of those images remaining available for the production of such beam portion.

Referring to Figs. 12 and 13, the outer side areas 40 comprise vertically extending horizontal light spreading flutes 52 having a spread of preferably eighteen degrees, while the primary intermediate side areas 41 comprise a pair of similarly disposed flutes 53 having a spread of preferably twenty-one degrees. Each of the intermediate areas 39 of the upper and lower intermediate sections 30 and 31 comprises a single vertically extending horizontal light spreading flute 54 having a spread of preferably thirty-two degrees, while each of the side areas 38 of said sections comprises a single similarly disposed flute 55 having a spread of preferably fifty degrees. Like the areas 42, each of the areas 38, 39, 40 and 41 is formed with upward bending prisms 51 of preferably one-half degree. As is apparent from the beam pattern illustrated in Fig. 14, the beam portions 38', 39', 40' and 41', produced by the areas 38, 39, 40 and 41 respectively, are disposed symmetrically about the vertical plane V—V, but due to the upward bending prisms 51, are offset or displaced above the horizontal line h—h passing through the reflector axis or aiming point X the same amount as the high intensity beam portion 42', so that the top surfaces of said beam portions 38', 39', 40' and 41' substantially coincide with each other and with the common top surfaces of the high intensity beam portions 36', 37', 42' and 43'. The resulting common top surface of the beam portions 36', 37', 38', 39', 40', 41', 42' and 43' thus produces a sharp light cut-off above a level one degree below the horizontal plane H—H. The increasing degree of spread of the flutes included within the areas 40, 41, 39 and 38 produces a widespread plate of light gradually decreasing in intensity towards the sides thereof.

Since the images projected through the remaining areas 44, 45 and 46 of the lens are the largest and most difficult to control of any projected through the same, the rays of light passing through said areas 44, 45 and 46 are utilized to produce the sideward and downward graduated intensity portions 44', 45' and 46' of the city driving beam; or, in other words, the illumination immediately in front of the vehicle. Each side area 44 of the center section 29 comprises a single vertically extending horizontal light spreading flute 47 similar to the flutes 47 of the areas 36 and 37; the center area 46 comprises a plurality of flutes 54 similar to the flutes 54 of the areas 39; while each of the intermediate areas 45 comprises a single flute 55 similar to the flutes 55 of the areas 38. Areas 44, 45 and 46 being located at the center of the lens, where the images are the largest and most difficult to control, the same are further provided with downward bending prisms in order to insure against the projection of upwardly directed glare rays which are likely to occur at such areas from inaccurately positioned light sources. Thus, area 44 is provided with a downward bending prism 56 of preferably two and one-half degrees, while the areas 45 and 46 are provided with downward bending prisms 57 preferably graded in intensity from three degrees at the top thereof to ten degrees at the bottom. The beam portions 44', 45' and 46' (Fig. 14) produced by the areas 44, 45 and 46 respectively, are symmetrically disposed about the vertical plane V—V, but due to the downward bending prisms 56 and 57, are disposed substantially, although not entirely, below the horizontal line h—h passing through the reflector axis.

Table I below lists the various areas into which our city driving lens 13 is divided, together with the corresponding degree of vertical prism and horizontal light spread.

Table I

| Area | Vertical prism | Horizontal spread |
| --- | --- | --- |
| | | Degrees |
| 36 | 1° up | 10 |
| 37 | None | 10 |
| 38 | ½° up | 50 |
| 39 | ½° up | 32 |
| 40 | ½° up | 18 |
| 41 | ½° up | 21 |
| 42 | ½° up | 15 |
| 43 | None | 12 |
| 44 | 2½° down | 10 |
| 45 | 3° to 10° down | 50 |
| 46 | 3° to 10° down | 32 |

The city driving lens 13 described above produces a highly efficient city driving beam. Furthermore, it is simple in construction and positive in operation, and when properly mounted in a headlight, and especially in one of the type described herein, an accurately positioned and powerful beam of light is projected in advance of the vehicle having a sharp light cut-off or decrease in intensity above a level one degree below the horizontal plane H—H passing through the reflector focal point. Said beam is further characterized by the absence of glare normally resulting from inaccurately disposed light sources. In addition, our lens is distinguished by the absence of light sources in the lens itself normally producing glare, due largely to the use of upwardly bending prisms thereon. The said light sources in the lens are formed by the rounded corners obtained in practice at the bases of the prisms. These corners form small lenses which, in downwardly bending prisms having their bases lowermost, direct concentrated beams of light above the horizontal into the eyes of an approaching driver. By employing upwardly bending prisms having their bases uppermost, the glaring beams of light projected through the corners of said bases are directed downward and therefore cannot cause glare. The upward refraction of the light projected through the prisms is then offset by tilting the reflector axis downward to obtain a beam having a sharp cut-off free from glare. This feature is more fully explained in application Serial No. 132,531, E. A. Howard et al., filed March 23, 1937.

In Figs. 15 to 26, we have illustrated in detail the country driving lens 14 with which the lamp 11 is equipped, and which is adapted to produce the country driving beam component previously referred to. This lens comprises a plurality of substantially horizontal sections (Fig. 15) consisting of a top section 58, a bottom section 59, a center section 60, and upper and lower intermediate sections 61 and 62 respectively. Each of the top and bottom sections 58 and 59 comprises a central area 63, intermediate areas 64, and side areas 65. The upper intermediate section 61 is composed of a central area 66, intermediate areas 67 and side areas 68, while the lower intermediate section 62 is composed of a central area 69, and intermediate and side areas 67 and 68 respectively similar to the areas 67 and 68 of the upper intermediate section 61. The center section 60 is composed of side areas 63, similar to the areas 63 of the top and bottom sections 58 and 59, primary intermediate areas 70, secondary intermediate areas 71, and a central area 72.

Referring to Figs. 15 and 23, the side areas 65 of the top and bottom sections 58 and 59 are utilized to produce the high intensity portion of the country driving beam component, as indicated at 65' in the beam pattern shown in Fig. 27. Each of these side areas 65 comprises a plurality of vertically extending horizontal light spreading flutes 73 having a spread of preferably four degrees. The high intensity beam portion 65' (Fig. 27), produced by the areas 65, is disposed symmetrically about the vertical plane V—V passing through the reflector focal point parallel to the longitudinal axis of the associated vehicle. Said beam portion 65' is also disposed symmetrically about a horizontal line h—h intersecting the reflector axis. It will be noted that the reflector axis is preferably tilted downwardly a slight amount below the horizontal plane H—H passing through the reflector focal point, as indicated at Y in Fig. 27. As there shown, the aiming point Y of such axis is preferably located approximately one-half degree below the H—H plane, thus displacing the high intensity beam portion 65' a like amount downwardly with respect to said plane.

The widespread graduated intensity portion of the country driving beam component, indicated at 63', 64', 67', 68', 69' and 66' in Fig. 27, is produced by the areas 63, 64, 67, 68, 69 and 66 respectively. Each of the areas 63, constituting the central portion of the top and bottom sections 58 and 59 and the side portions of the center section 60, comprises a plurality of vertically extending horizontal light spreading flutes 74 having a spread of preferably six degrees, while each of the areas 64 is composed of a single similarly disposed flute 75 having a spread of preferably eight degrees. Each of the intermediate areas 67 of the upper and lower intermediate sections 61 and 62 consists of a plurality of vertically extending horizontal light spreading flutes 76 having a spread of twelve degrees. Each of the areas 67 of the upper intermediate section 61 preferably consists of a pair of such flutes 76, while each of the areas 67 of the lower intermediate section 62 preferably consists of three such flutes 76. The side areas 68 of the upper and lower intermediate sections 61 and 62 consist of vertically extending horizontal light spreading flutes 77 having a spread of preferably eighteen degrees. The central area 69 of the lower intermediate section 62 likewise consists of a plurality of flutes 77 similar to the flutes 77 of areas 68. The central area 66 of the upper intermediate section 61 comprises a plurality of vertically extending horizontal light spreading flutes 78 having a spread of preferably thirty-two degrees.

Referring to the beam pattern shown in Fig. 27, the beam portions 63', 64', 67', 68', 69' and 66', produced by the areas 63, 64, 67, 68, 69 and 66 respectively, are disposed symmetrically about the vertical plane V—V and also about the horizontal line h—h. The increasing degree of spread of the flutes included within the areas 63, 64, 67, 68, 69 and 66 produces a widespread plate of light gradually decreasing in intensity towards the sides thereof.

The remaining areas 70, 71 and 72 of the center section 60 are utilized to produce additional sideward graduated-intensity illumination, and also to increase the vertical extent of the driving beam component adjacent the vertical center line of the same. Each of the primary intermediate areas 70 of said center section 60 consists of a plurality of flutes 73 similar to the flutes 73 of the areas 65, while each of the secondary intermediate areas 71 consists of a single flute 76 similar to the flutes 76 of the areas 67. The central area 72 comprises a plurality of vertically extending horizontal light spreading flutes 79 having a spread of preferably fifteen degrees. In addition to the flutes just described, the areas 70, 71 and 72 are further provided with downward bending prisms 80 of preferably one degree, as shown in Figs. 16 to 20. The beam portions 70', 71' and 72' (Fig. 27) produced by the areas 70, 71 and 72 respectively, are disposed symmetrically about the vertical plane V—V, but due to the downward bending prisms 80, are slightly displaced or offset downwardly with respect to the h—h line.

Table II below lists the various areas into which the country driving lens 14 is divided, together with the corresponding degree of vertical prism and horizontal light spread.

*Tabe II*

| Area | Vertical prism | Horizontal spread |
|---|---|---|
|  |  | Degrees |
| 63 | 0° | 6 |
| 64 | 0° | 8 |
| 65 | 0° | 4 |
| 66 | 0° | 32 |
| 67 | 0° | 12 |
| 68 | 0° | 18 |
| 69 | 0° | 18 |
| 70 | 1° down | 4 |
| 71 | 1° down | 12 |
| 72 | 1° down | 15 |

When properly mounted in a reflector lamp of the type shown in Fig. 2, the country driving lens 14 described above produces a highly efficient country driving beam component which, when added to the previously described base beam, results in the formation of a very satisfactory composite country driving beam which is higher straight down the road than said base beam, and the pattern of which is outlined in Fig. 28, wherein A represents the base beam projected by one of the city driving lamps 10, and B the country driving beam component projected by lamp 11. As is evident from Figs. 27 and 28, the country driving beam component B, produced by the lens 14, consists of a relatively thin plate of light disposed substantially symmetrically about the horizontal plane H—H and the vertical plane V—V to thereby provide illumination a maximum distance in advance of the vehicle. Said beam component is further characterized by a high intensity portion disposed symmetrically about the vertical center plane V—V which, when supplemented by the similarly disposed high intensity portion of the base beam A, provides illumination of a maximum intensity down the center of the highway. The driving beam component B is also graduated in intensity towards each side thereof, said graduated intensity portions, when combined with the sideward and downward graduated intensity portions of the base beam A, eliminating any sudden and objectionable changes in intensity in the composite country driving beam towards the sides and the bottom of the same.

In Figs. 29 to 37, we have illustrated in detail the country meeting lens 15 with which the lamp 12 is equipped, and which is adapted to produce the country meeting beam component mentioned hereinbefore. This lens comprises a plurality of substantially horizontal sections (Fig. 29) disposed adjacent the vertical center line of the lens and consisting of a top section 81, a bottom section 82, a center section 83, and upper and lower intermediate sections 84 and 85 respectively. Each of the top and bottom sections 81 and 82 comprises a central area 88, side areas 92, and intermediate areas 89. Each of the intermediate sections 84, 85 comprises side areas 92, intermediate areas 94, and a central area 95. The center section 83 consists of side areas 93 and a central area 96. The lens further comprises a plurality of vertically extending sections disposed adjacent the sides of the same and consisting of outer side sections or segments 86, 86 and inner side sections 87, 87. Each of the outer side sections 86, 86 is composed of a plurality of areas 90, while each of the inner side sections 87, 87 is composed of a plurality of areas 91.

Since the filament images projected through the areas 88, 89, 90 and 91 are the smallest of the various images projected through the lens, and therefore the easiest to control, the rays of light passing through such areas are utilized to produce the high intensity portion of the asymmetric or meeting beam component. These areas are provided with both upward and left bending prisms for the purpose of minimizing glare by the elimination of glare-producing sources of light in the lens itself. Thus, each of the areas 88 is provided with an upwardly bending vertical prism 97, preferably of three degrees, while each of the areas 89, 90 and 91 is provided with a similar prism 98, preferably of two degrees. In addition, the said areas 88 and 89 are provided with left bending horizontal prisms 99 (Fig. 35) preferably of nine degrees; the areas 90 with similar prisms 100 preferably of eleven degrees; and the areas 91 with prisms 101 preferably of ten degrees. Inasmuch as the horizontal spread of the high intensity portion of the beam should be relatively small, the degree of spread of the flutes included within the areas 88, 89, 90 and 91 should be very little. Accordingly, each of the areas 88, 89, and 90 consists of a plurality, and the areas 91 of a single vertically extending horizontal light spreading flute 102 having a spread of preferably one degree.

The beams produced by the areas 88, 89, 90 and 91, and indicated at 88', 89', 90' and 91' in the beam pattern (Fig. 38), together comprise the high intensity portion of the asymmetric or meeting beam component C. As is apparent from the beam pattern, this high intensity portion 88', 89', 90' and 91' is directed substantially above and entirely to the left of the reflector axis or aiming point Z by the upward bending prisms 97, 98 and left bending prisms 99, 100 and 101 formed on the lens within the areas 88, 89, 90 and 91 thereof. However, by aiming the reflector axis the proper distance below the horizontal plane H—H passing through the reflector focal point, and to the right of the vertical plane V—V passing through said point parallel to the longitudinal axis of the associated vehicle, as indicated at Z, the high intensity beam portions 88', 89', 90' and 91' may be so directed as to lie both below the H—H plane and to the right of the V—V plane, thereby eliminating the danger of such beam portions striking the eyes of approaching drivers. Thus, when the aiming point Z is located approximately three degrees below the H—H plane and eight degrees to the right of the V—V plane, as shown in Fig. 38, the top surfaces of the beam portions 88', 89', 90' and 91' will substantially coincide with the H—H plane, while the left edges of said beam portions will substantially coincide with the V—V plane.

To further illuminate the right side of the roadway, and especially the extreme right portion thereof up to the horizontal plane H—H so as to reveal banks, walls or objects bordering the right side of such roadway, the beam portions 92', 93', 94' and 95' are provided. These beam portions are produced by the areas 92, 93, 94 and 95 of the country meeting lens, each of said areas being provided with an upwardly bending vertical prism 103 preferably of one degree. In addition, the said areas are provided with left bending horizontal prisms, areas 92 being provided with prisms 104 of nine degrees, areas 93 with prisms 105 of seven degrees, areas 94 with prisms 106 of four degrees, and areas 95 with prisms 107 of two degrees. The areas 92, 93, 94 and 95 are also formed with vertically extending horizontal light spreading flutes, areas 92 and 93 each consisting of a single flute 102 similar to the flutes 102 included within the areas 88, 89, 90 and 91; areas 94 each consisting of a pair of flutes 108 having a spread of preferably two degrees; and areas 95 each consisting of a plurality of flutes 109 having a spread of preferably four degrees.

The beam portions 92', 93', 94' and 95', due to the upwardly bending prisms 103 formed within the areas 92, 93, 94 and 95, are slightly offset upwardly with respect to the horizontal line h—h (Fig. 38) intersecting the reflector axis or aiming point Z, so that the top surfaces of said beam portions, like the top surfaces of the high intensity beam portions 88', 89', 90' and 91', substantially coincide with the horizontal plane H—H when the reflector axis is aimed at a point Z approximately three degrees below said horizontal plane. The beam portions 92', 93', 94' and 95', due to the left bending prisms 104, 105, 106 and 107 formed within the areas 92, 93, 94 and 95 respectively, are likewise offset varying amounts to the left of the vertical line v—v intersecting the reflector axis Z, so that the left edges of said beam portions, like the left edges of the high intensity beam portions 88', 89', 90' and 91', substantially coincide with the vertical plane V—V when the reflector axis is aimed at a point Z approximately eight degrees to the right of said vertical plane. The increasing degree of spread of the flutes included within the areas 92, 93, 94 and 95 produces a relatively wide plate of light gradually decreasing in intensity towards the right side only of the same.

The central area 96 of the center section 83 is utilized to produce additional illumination on the right side of the roadway and consists of a plurality of vertically extending horizontal light spreading flutes 109, similar to the flutes 109 of the areas 95. The beam portion 96' (Fig. 38) produced by the area 96 is disposed symmetrically about both the horizontal line h—h and the vertical line v—v intersecting the reflector axis Z, so that the top surface of such beam portion lies approximately one degree below the horizontal plane H—H, and the left edge substantially coincides with the vertical plane V—V when the reflector axis is aimed at a point Z three degrees below said horizontal plane and eight degrees to the right of said vertical plane.

Table III below lists the various areas into which the supplementary country meeting lens 15 is divided, together with the corresponding degree of vertical and horizontal prism and horizontal light spread.

Table III

| Area | Vertical prism | Horizontal prism | Horizontal spread |
|---|---|---|---|
| | | | Degrees |
| 88 | 3° up | 9° left | 1 |
| 89 | 2° up | 9° left | 1 |
| 90 | 2° up | 11° left | 1 |
| 91 | 2° up | 10° left | 1 |
| 92 | 1° up | 9° left | 1 |
| 93 | 1° up | 7° left | 1 |
| 94 | 1° up | 4° left | 1 |
| 95 | 1° up | 2° left | 2 |
| 96 | None | None | 4 |

The supplementary country meeting lens 15 just described, when properly mounted in a reflector lamp of the type shown in Fig. 2, produces an accurately formed meeting beam component which, when added to the previously described base beam, results in the formation of a highly efficient asymmetric or country meeting beam which is higher on the right than said base beam, and the pattern of which is outlined in Fig. 39 wherein A represents the base beam produced by one of the city driving lamps 10, and C represents the country meeting beam component. This meeting beam component C, produced by the lens 15, consists of a plate of light of sufficient width to illuminate the right side only of the roadway, and is characterized by a high intensity portion located at the right of the vertical plane V—V and below the horizontal plane H—H, closely adjacent to said planes, together with a widened graduated intensity portion extending towards the right side only of said beam component. Said meeting beam component is further characterized by a sharp light cut-off to the left of said vertical plane and above said horizontal plane. As a consequence, the composite country meeting or asymmetric beam, shown in outline in Fig. 39, is characterized by a sharp and distinct light cut-off to the left of the vertical plane V—V and above a level one degree below the horizontal plane H—H, this being the level of the top surface of the city driving or base beam A. The entire area to the left of the V—V plane and down to said level of one degree below the H—H plane, constituting the likely location of the eyes of approaching drivers, is accordingly substantially devoid of all light rays. This dark or unilluminated area thus minimizes strain on the eyes of approaching drivers.

It is further evident, from Figs. 38 and 39, that the country meeting lens 15 is adapted to direct substantially all of the light rays passing therethrough onto the right side of the highway where it is needed to offset or counteract the decrease in visibility of such side occasioned by the glare of the approaching headlights. Furthermore, by the use of upwardly and left bending prisms in the lens 15, there are no undesirable light sources in such lens itself which ordinarily produce considerable glare.

In Figs. 40 to 49, we have shown in detail the country driving lens 26 with which the lamp 11 is equipped in the modification of our invention previously referred to. In this modification, the lamp 11 alone or in combination with other lamps 11, is adapted to produce a full country driving beam, without the use of the base beam employed in the formation of the previously described composite country driving and meeting beams. Lens 26 is accordingly adapted to produce a full country driving beam by itself. This lens is quite similar to the country driving lens described and claimed in our co-pending United States patent application Serial No. 132,530, filed March 23, 1937.

Referring to Fig. 40, the lens 26 comprises a plurality of substantially horizontal sections consisting of a top section 110, a bottom section 111, a center section 112, and upper and lower intermediate sections 113 and 114 respectively. Each of said sections consists of a plurality of vertically extending horizontal light spreading flutes, certain of which are of different degrees of spread. In addition, the central portion of the center section 112 is formed with a series of downwardly bending prisms for the purpose of depressing the rays of light projected therethrough.

Each of the top and bottom sections 110 and 111 consists of a central area 115, intermediate areas 116, and side areas 117. The upper intermediate section 113 consists of a central area 118, intermediate areas 119, and side areas 120, while the lower intermediate section 114 consists of a central area 121 and side areas 119. The center section 112 consists of side areas 115, primary intermediate areas 122, secondary intermediate areas 123, tertiary intermediate areas 124, and a central area 125.

Since the filament images projected through the top and bottom sections 110, 111, and through the side areas 115 of the center section 112, are the smallest and therefore the easiest to control of the various images projected through the lens, the rays of light passing through such sections and areas are utilized to produce the high intensity portion M (Fig. 50) of the country driving beam. Each of the areas 115, comprising the central portions of the top and bottom sections 110, 111, and the side portions of the center section 112, consists of a plurality of flutes 126 (Figs. 46 and 48) having a spread of preferably six degrees. Each of the intermediate areas 116 of the top and bottom sections 110, 111 consists of a single flute 127 having a spread of preferably eight degrees, while each of the side areas 117 of said sections consists of a plurality of flutes 128 having a spread of preferably four degrees.

The concentrated beam of light or high intensity portion produced by the areas 115, 116 and 117, and shown in cross section at M in the beam pattern (Fig. 50), is disposed symmetrically about the vertical plane V—V passing through the reflector focal point parallel to the longitudinal axis of the associated vehicle. The said beam portion is also disposed symmetricaly about a horizontal line h—h intersecting the reflector axis. By aiming the reflector axis downward at a point P a half degree or so below the horizontal plane H—H passing through the reflector focal point, the high intensity beam portion M will be offset or displaced a like amount downwardly with respect to the said horizontal plane H—H, so that the top surface of such beam portion extends just a degree or two above the said horizontal plane. The high intensity beam portion M provides illumination of the highway a maximum distance in advance of a fast moving vehicle, said illumination being assured under most conditions of loading and longitudinal rocking motion, or when approaching an incline.

Figure 47:
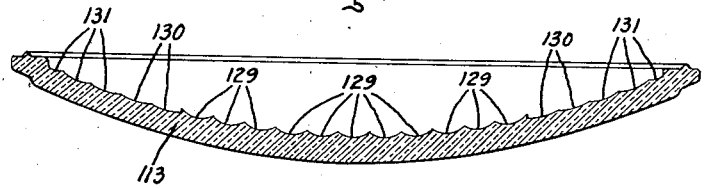

Of the lens area remaining available, the areas 118, 119, 120 and 121, constituting the upper and lower intermediate sections 113 and 114, are best suited for the production of the widespread graduated intensity portion N of the country driving beam for the reason that the filament images projected through such areas are the next in smallness of size and ease of control to those projected through the areas 115, 116 and 117. Referring to Fig. 47, the central area 118 of the upper intermediate section 113 is composed of a plurality of flutes 129 having a spread of preferably thirty-two degrees, while each of the intermediate areas 119 of said upper intermediate section consists of a pair of flutes 130 having a spread of preferably twelve degrees, and each of the side areas 120 consists of a plurality of flutes 131 having a spread of preferably eighteen degrees. The central area 121 of the lower intermediate section 114 is composed of a plurality of flutes 131 similar to the flutes 131 of areas 120, while the side areas 119 of said lower intermediate section consist of a plurality of flutes 130 similar to the flutes 130 of the intermediate areas 119 of the upper intermediate section 113.

The particular construction and location of the flutes 129, 130 and 131 described above results in the production of a widespread and relatively thin plate or beam of light N (Fig. 50) which smoothly tapers off in intensity towards the sides thereof, and is of sufficient width and height to reveal curves in the highway and objects at the sides thereof. Like the high intensity beam portion M, the plate of light N is also disposed symmetrically about the vertical plane V—V and the horizontal line h—h intersecting the reflector axis or aiming point P. Due to the greater vertical extent of the graduated intensity beam portion N, resulting from the use of larger images to make up such beam portion, the top surface thereof extends a slight distance above the top surface of the high intensity beam portion M, as shown in the beam pattern.

Figure 48:
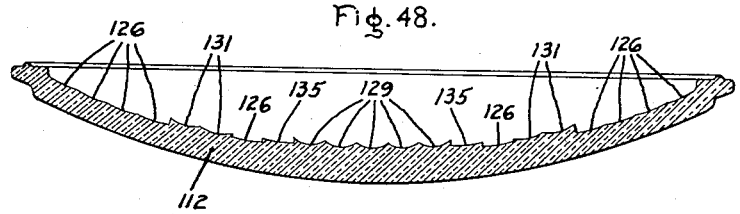
Figure 49:
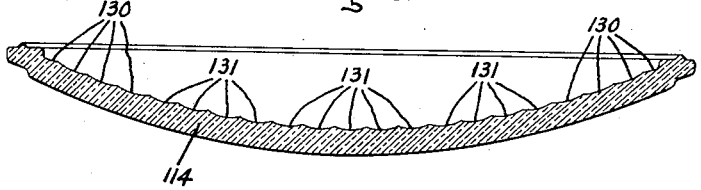

The remaining areas 122, 123, 124 and 125 of the lens 26 are used to furnish the illumination immediately in front of the vehicle, which illumination is graduated in intensity both sideward and downward. Because the filament images projected through these areas 122, 123, 124 and 125 are the largest and most difficult to control, the said areas are all formed with downwardly bending prisms for the purpose of depressing or bending down the rays of light projected therethrough. These prisms further serve to direct the light rays passing through the same immediately in front of the vehicle to thereby illuminate the foreground. Referring to Figs. 41 to 44 inclusive, it will be seen that each of the primary and secondary intermediate areas 122 and 123 of the center section 112 is formed with downwardly bending prisms 132 of preferably three degrees; the tertiary intermediate areas 124 each with a downwardly bending prism 133 of preferably four degrees; and the central area 125 with a downwardly bending prism 134 preferably graded from three degrees at the top thereof to ten degrees at the bottom. Thus the maximum amount of downward bending of the light rays passing through areas 122, 123, 124 and 125 occurs at the central area 125 where the images are the largest and the most difficult to control. The areas 122, 123, 124 and 125 are also formed with light spreading flutes as shown in Fig. 48, which distribute the downwardly bent rays of light across the width of the highway to entirely illuminate the same. Each of the areas 122 consists of a pair of flutes 131 similar to the flutes 131 of the areas 120 and 121; each of areas 123 consists of a single flute 126 similar to the flutes 126 of the areas 115; each of areas 124 consists of a single flute 135 having a spread of ten degrees; and the central area 125 consists of a plurality of flutes 129 similar to the flutes 129 of the area 118.

As is true with the beam portions M and N of the full country driving beam, the sideward and downward graduated intensity beam portion O, produced by the areas 122, 123, 124 and 125 of the lens 26, is likewise disposed symmetrically about the vertical plane V—V (Fig. 50). With the reflector axis aimed at the point P, the top surface of said beam portion O is located a degree or so below the horizontal plane H—H but slightly overlapping both the high intensity portion M and the wide-spread portion N. The varying degree of the prisms and of the spread of the flutes included within the areas 122, 123, 124 and 125 of the lens causes the beam portion O to be graduated in intensity both sideward and downward, thereby eliminating any sudden changes in intensity.

In Table IV below are tabulated the various areas into which the country driving lens 26 is divided, together with the corresponding degree of vertical prism and horizontal light spread.

Table IV

| Area | Vertical prism | Horizontal spread |
|---|---|---|
| | | Degrees |
| 115 | 0° | 6 |
| 116 | 0° | 8 |
| 117 | 0° | 4 |
| 118 | 0° | 32 |
| 119 | 0° | 12 |
| 120 | 0° | 18 |
| 121 | 0° | 18 |
| 122 | 3° | 18 |
| 123 | 3° | 6 |
| 124 | 4° | 10 |
| 125 | 3 to 10° graded down | 32 |

When the country driving lens 26 is mounted in a headlight, and especially in one of the type shown in Fig. 2, a strong, powerful, and highly efficient country driving beam is projected therefrom which clearly illuminates the highway a maximum distance in advance of the vehicle at all times, thus reducing the dangers connected with fast driving. In addition, ths full country driving beam is graduated in intensity both sidewardly and downwardly so as to eliminate any sudden changes in intensity which might tend to cause eye strain to the driver of the vehicle.

The flutes and prisms formed on each of the various lenses 13, 14, 15 and 26 described above are preferably located on the rear or inner surfaces of the same, where the various shoulders and corners formed by said flutes and prisms are not so apt to collect foreign material normally tending to decrease the light penetration efficiency of the lens.

It will be apparent to those skilled in the art that various changes may be made in the design of the lenses as shown without departing from the spirit of the invention, such as altering the shapes of the sections and placing the flutes on the exterior or outer surfaces. Also, the light directing effect may be derived from configurated reflectors instead of from lenses.

In Figs. 51, 52, 53, 54 and 55, we have illustrated diagrammatically various lighting circuits which may be employed to control the different beams comprising our vehicle additive headlighting system. In the system shown in Fig. 51, both of the city lamps 10, 10 are used to produce the base beam A for both the composite country driving and meeting beams. Referring to Fig. 51, current from the battery 140 is supplied to a main light switch 141 having three conducting arms 142, 143 and 144, and three different positions, hereinafter referred to as the first, second and third positions as the switch is rotated clockwise, as shown by the arrow. When the main switch 141 is turned from its off position to the position shown in the drawings, which is the first position, the current supplied to said switch by the battery passes through switch arm 142 and lead 145 to the parking lights 146, thereby energizing the same. Current also passes through switch arm 144 and lead 147 to the tail lamp 148.

To produce the city driving or base beam A (Fig. 14), the main switch 141 is rotated clockwise to its second position, in which position the current from the battery passes through switch arm 142 and lead 149 to the two city driving lamps 10, 10. As in the first switch position, the current also passes through switch arm 144 and lead 147 to the tail lamp 148.

To produce either the composite country driving beam (Fig. 28) or the composite country meeting or asymmetric beam (Fig. 39), the main switch is further rotated clockwise to its third position, in which position current from the battery 140 passes as before through switch arm 142 and lead 149 to the two city driving lamps 10, 10, thus producing the base beam A, and also passes through switch arm 144 and lead 147 to the tail lamp 148. In addition, the current passes through switch arm 143 and lead 150 to a foot switch 151, which is adapted to energize either the country driving lamp 11 or the country meeting lamp 12, depending upon the position of the same. Thus, when the foot switch 151 is in the position shown in the drawings, the current supplied to said switch passes through the same and thence through lead 152 to the country driving lamp 11, thereby energizing said lamp and producing the country driving beam component B (Fig. 27) which is thus added to the base beam A to form the composite country driving beam. When the foot switch 151 is moved to its alternate position, the current supplied to said switch passes through the same and thence through lead 153 to the country meeting lamp 12, thereby energizing said lamp and producing the country meeting beam component C (Fig. 38) which is thus added to the base beam A to form the composite country meeting or asymmetric beam.

In producing the composite country driving beam, it may be desirable to decrease the intensity of the base beam provided by the two city driving lamps 10, 10. This may be accomplished either by inserting a resistance in series with said lamps 10, 10 when the country driving lamp 11 is operated, or alternatively, by using only one of the said lamps 10 for the production of the base beam.

Fig. 52 illustrates a lighting circuit in which a resistance is automatically connected in series with the two city driving lamps 10, 10 whenever the country driving lamp 11 is operated. In this system, current from the battery 140 is supplied to the main light switch 141 the same as in Fig. 51. When the said switch 141 is in its first position, the current passes through switch arm 142 and lead 145 to the parking lamps 146. By moving the switch 142 to its second position, the current passes through switch arm 142 and lead 149 to the city driving lamps 10, 10, thus producing the city driving beam A.

The composite country driving and meeting beams are produced by moving the main switch to its third position, in which position the current from the battery 140 passes through switch arm 142 and lead 154, and through switch arm 143 and lead 150, to the two arms 155 and 156 respectively of the foot switch 151, the said switch arms 155 and 156 being insulated from each other. When the foot switch 151 is in the position shown in the drawings, the current supplied to switch arm 155 passes through a resistance 157 and thence through lead 149 to the two city driving lamps 10, 10, thus producing the base beam A. The resistance thus connected in series with the said lamps 10, 10, diminishes the intensity of the illumination provided by the base beam. Obviously, the desired intensity of the base beam may be obtained by the insertion of the proper amount of resistance. The current supplied to switch arm 156 passes through lead 152 to the country driving lamp 11, thereby producing the country driving beam component B which is thus added to the reduced-intensity base beam A to form the composite country driving beam.

When the foot switch 151 is in the alternate position from that shown in the drawings, the current supplied to switch arm 155 passes through lead 158 and thence through lead 149 to the two city lamps 10, 10, thereby producing the full-intensity base beam A. The current supplied to switch arm 156 passes through lead 153 to the country meeting lamp 12, thereby producing the country meeting beam component C which is thus added to the full intensity base beam A to form the composite country meeting or asymmetric beam.

In all three positions of the main light switch 141 it will be noted that the current supplied thereto by the battery 140 passes through switch arm 144 and lead 147 to the tail lamp 148, thereby energizing the same.

The lighting circuits illustrated in Figs. 53 and 54 are both adapted to energize only one of the city driving lamps whenever the country driving lamp 11 is operated. The circuit shown in Fig. 53 differs from that shown in Fig. 54 in that the composite country meeting or asymmetric beam is formed by also utilizing the light from only one of the city lamps 10 to produce the base beam portion A of said composite beam.

Referring to Fig. 53, when the main light switch 141 is in its first position, as shown in the drawings, the current supplied to the same by the battery 140 passes through switch arm 142 and lead 145 to the parking lamps 146, and also passes through switch arm 144 and lead 147 to the tail lamp 148. Here again it will be noted that in all three positions of the main light switch current passes through switch arm 144 and lead 147 to the tail lamp 148.

By moving the main switch 141 to its second position, the current supplied thereto will pass through switch arm 142 and lead 159 to the left city driving lamp 10, and also passes through switch arm 143 and lead 160 to the right city driving lamp 10. Both of the lamps 10, 10 are accordingly energized, thereby producing the city driving or base beam A.

To produce the composite country driving and meeting beams, the main switch 141 is moved to its third position. The current supplied to said switch then passes through switch arm 142 and lead 154, and through switch arm 143 and lead 150, to the two arms 155 and 156 respectively of the foot switch 151. As in Fig. 52, the two switch arms 155 and 156 are likewise insulated from each other. When the foot switch 151 is in the position shown in the drawings, the current supplied to switch arm 155 passes through lead 161 and thence through lead 159 to the left city driving lamp 10, thereby producing the base beam A, while the current supplied to switch arm 156 passes through lead 152 to the country driving lamp 11, thus adding the country driving beam component B to the base beam A to form the composite country driving beam.

By moving the foot switch 151 to its alternate position from that shown in the drawings, the current supplied to switch arm 155 will pass through lead 162 and thence through lead 160 to the right city lamp 10, thereby producing the base beam A, while the current supplied to switch arm 156 will pass through lead 153 to the country meeting lamp 12, thus adding the country meeting beam component C to the base beam A to produce the composite country meeting or asymmetric beam.

It will be observed that in the above system we prefer to operate the left city driving lamp 10 when the country driving lamp 11, located on the right side of the vehicle, is operated, and conversely, the right city driving lamp 10 when the country meeting lamp 12, located on the left side of the vehicle, is operated. This is done so that both sides of the vehicle will be marked by illuminated headlamps when either of the composite country beams is being used, and also to conform to present general practice. This arrangement provides, in effect, a "criss-cross" lighting system in which an upper lamp on one side and a lower lamp on the opposite side of the vehicle combine to produce one of the composite country beams, while the other upper lamp and the opposite other lower lamp combine to produce the other of said composite country beams.

The lighting circuit shown in Fig. 54 is similar to that shown in Fig. 53 except that when the foot switch 151 is in its alternate or country meeting beam position, being the position indicated in Fig. 54, the switch arm 155 bridges two adjacent switch contacts so that the current supplied to said switch arm 155 passes through both leads 162 and 163, and thence through the leads 160 and 159 respectively, to the two city driving lamps 10, 10, thus producing the full intensity base beam A for the composite country meeting or asymmetric beam.

Fig. 55 illustrates the lighting circuit for the modification of our invention in which one or more country driving lamps 11 are adapted to produce a full country driving beam, without being supplemented by a base-beam as in the other forms of the invention. The meeting beam in this system, however, is produced as before, i. e., by the addition of a meeting beam component C to the base beam A.

Referring to Fig. 55, the lighting circuit there shown is the same as that shown in Fig. 52 for the first two positions of the main light switch 141. Thus the first position of said switch energizes the parking lamps 146 and the tail lamp 148, while the second position of said switch energizes both city lamps 10, 10, producing the city driving or base beam A, and also energizes the tail lamp 148.

When the main switch is moved to its third position, the current supplied thereto from the battery 140 passes, as in Fig. 52, through switch arm 142 and lead 154, and through switch arm 143 and lead 150 to the two arms 155 and 156 respectively of the foot switch 151. Here again the said foot switch arms 155 and 156 are insulated from each other. With the foot switch in the position shown in the drawings, the current supplied to switch arm 156 passes through lead 152 to the country driving lamp 11, thus producing the full country driving beam, the pattern of which is shown in Fig. 50. At the same time, the current supplied to switch arm 155 passes through lead 164 and thence through lead 145 to the two parking lamps 146, which thus mark the sides of the vehicle.

When the foot switch 151 is moved to its alternate position from that shown in the drawings, the current supplied to switch arm 155 passes through lead 158 and thence through lead 149 to the two city driving lamps 10, 10, thus producing the base beam A, while the current supplied to switch arm 156 passes through lead 153 to the country meeting lamp 12, producing the country meeting beam component C, which is thus added to the base beam A to form the composite country meeting or asymmetric beam, the pattern of which is shown in Fig. 39.

As in each of the previous circuits, the tail lamp 148 is energized in all three positions of the main light switch 141 by current supplied to said lamp through switch arm 144 and lead 147.

The different lighting circuits shown and described above are intended for purposes of illustration only, and it should be understood that various changes may be made therein without departing from the scope of our invention. For example, instead of using a double-armed foot switch, as shown in certain of the lighting circuits above, we have found that relays may be advantageously employed together with a simple single-armed foot switch.

What we claim as new and desire to secure by Letters Patent of the United States is:

1. In a vehicle headlight system, the combination of a plurality of headlamps each comprising a concave light-concentrating reflector and lens and being provided with a light source adjacent the focus thereof, at least one of said headlamps constituting a base-beam lamp for use in city driving and having its lens provided with light-directing elements for projecting a beam of light of wide spread with its top below the horizontal, another of said headlamps constituting a country driving lamp and having its lens provided with light-directing elements for projecting a beam of light of high intensity straight down the road, the top of the beam projected by said country driving lamp being above the top of said base beam, and another of said headlamps constituting a country meeting lamp and having its lens provided with light-directing elements for projecting a beam of light at least a portion of which is higher than said base beam on the right side of the road only, and switch means operable to energize said base-beam lamp alone or to selectively energize either said base-beam lamp alone or to selectively energize either said country driving lamp or said country meeting lamp simultaneously with said base-beam lamp.

2. In a vehicle headlighting system, the combination of a plurality of headlamps each comprising a concave light-concentrating reflector and lens and being provided with a light source adjacent the focus thereof, at least one of said headlamps constituting a base-beam lamp for use in city driving and having its lens provided with light-directing elements for projecting a beam of light of wide spread with its top below the horizontal; another of said headlamps constituting a country driving lamp having its lens divided into top and bottom, upper and lower intermediate and middle sections extending horizontally across the width of said lens, the extreme side portions of said top and bottom sections containing vertically extending narrow light spreading flutes, the middle portions of said top and bottom sections, the side portions of said upper and lower intermediate sections and the middle portions of said intermediate sections having vertically extending flutes of successively greater light spread, and the central portion of said middle section having vertically extending flutes of comparatively narrow light spread and prisms of slight vertical refracting power, the top of the beam from said country driving lamp being above the top of said base beam; and switch means operable to energize said base-beam lamp alone or to energize said country driving lamp simultaneously therewith.

3. In a vehicle headlighting system, the combination of a plurality of headlamps each comprising a concave light-concentrating reflector and lens and being provided with a light source adjacent the focus thereof, at least one of said headlamps constituting a base-beam lamp for use in city driving and having its lens provided with light-directing elements for projecting a beam of light of wide spread with its top below the horizontal; another of said headlamps constituting a country driving lamp having its lens divided into top and bottom, upper and lower intermediate and middle sections extending horizontally across the width of said lens, the extreme side portions of said top and bottom sections containing vertically extending narrow light spreading flutes, the middle portions of said top and bottom sections, the side portions of said upper and lower intermediate sections and the middle portions of said intermediate sections having vertically extending flutes of successively greater light spread, and the central portion of said middle section having vertically extending flutes of comparatively narrow light spread and prisms of slight vertical refracting power, the top of the beam from said country driving lamp being above the top of said base beam; and another of said headlamps constituting a country meeting lamp and having its lens provided with light-directing elements for projecting a beam of light at least a portion of which is higher than said base beam on the right side of the road only; and switch means operable to energize said base-beam lamp alone or to selectively energize either said country driving lamp or said country meeting lamp simultaneously with said base-beam lamp.

4. In a vehicle headlighting system, the combination of a plurality of headlamps each comprising a concave light-concentrating reflector and lens and being provided with a light source adjacent the focus thereof, at least one of said headlamps constituting a base-beam lamp for use in city driving and having its lens provided with light-directing elements for projecting a beam of light of wide spread with its top below the horizontal; another of said headlamps constituting a country meeting lamp and having its lens divided into side segments, the remainder of said lens being divided into top and bottom, upper and lower intermediate and middle sections extending horizontally across the lens between said side segments, the said side segments and top and bottom sections containing vertically extending flutes of slight light spread and prisms for refracting the light passing therethrough laterally to provide an area of concentrated light above the top of said base beam but on the right side of the road only, the side portions of said middle section, the side portions of said upper and lower intermediate sections, the middle portions of said intermediate sections and the central portion of said middle section containing vertically disposed flutes of successively greater light spread to produce successively laterally wider areas of light above the top of said base beam on the right side of the road only; and switch means operable to energize said base beam lamp alone or to energize said country meeting lamp simultaneously therewith.

5. In a vehicle headlighting system, the combination of a plurality of headlamps each comprising a concave light-concentrating reflector and lens and being provided with a light source adjacent the focus thereof, at least one of said headlamps constituting a base-beam lamp for use in city driving and having its lens provided with light-directing elements for projecting a beam of light of wide spread with its top below the horizontal, another of said headlamps constituting a country driving lamp and having its lens provided with light-directing elements for projecting a beam of light of high intensity straight down the road, the top of the beam projected by said country driving lamp being above the top of said base beam; another of said headlamps constituting a country meeting lamp and having its lens divided into side segments, the remainder of said lens being divided into top and bottom, upper and lower intermediate and middle sections extending horizontally across the lens between said side segments, the said side segments and top and bottom sections containing vertically extending flutes of slight light spread and prisms for refracting the light passing therethrough laterally to provide an area of concentrated light above the top of said base beam but on the right side of the road only, the side portions of said middle section, the side portions of said upper and lower intermediate sections, the middle portions of said intermediate sections and the central portion of said middle section containing vertically disposed flutes of successively greater light spread to produce successively laterally wider areas of light above the top of said base beam on the right side of the road only; and switch means operable to energize said base-beam lamp alone or to selectively energize either said country driving lamp or said country meeting lamp simultaneously with said base-beam lamp.

THEODORE W. FRECH.
ERNEST A. HOWARD.
KENNETH D. SCOTT.